(12) United States Patent
Kalaboukis et al.

(10) Patent No.: US 7,774,330 B2
(45) Date of Patent: Aug. 10, 2010

(54) METHOD AND SYSTEM OF PROVIDING USER AUGMENTED CONTENT

(75) Inventors: Chris Kalaboukis, Los Gatos, CA (US); Roberto Fisher, Santa Monica, CA (US); Ron Martinez, San Francisco, CA (US); Athellina Athsani, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 325 days.

(21) Appl. No.: 11/945,186

(22) Filed: Nov. 26, 2007

(65) Prior Publication Data

US 2009/0138495 A1 May 28, 2009

(51) Int. Cl.
*G06F 17/30* (2006.01)
(52) U.S. Cl. .................. 707/705; 707/802; 707/821; 715/230; 715/764
(58) Field of Classification Search ................. 707/609, 707/705, 802, 821; 715/230, 764
See application file for complete search history.

(56) References Cited

U.S. PATENT DOCUMENTS 5,796,393 A * 8/1998 MacNaughton et al. ..... 715/733

OTHER PUBLICATIONS

Fernandes et al., Web Annotation System Based on Web Services, 2005, IEEE, pp. 1-6.*

* cited by examiner

*Primary Examiner*—Fred I Ehichioya
(74) *Attorney, Agent, or Firm*—Hickman Palermo Truong & Becker LLP

(57) ABSTRACT

A method for enabling users to share information across websites. A user may add some information to augment a posting on a first website to annotate its content. The information may be displayed on the first website as a related file and stored in a user augmented content system (UACS) database as an individual document. Another user may add some information to a posting on a second website to enrich its content, and the information may be displayed on the second website as a related file and stored in the UACS database as another individual document. The documents may be stored together with some keywords, and may be tagged, indexed and searchable. Users may easily find out who contributed what to the websites, and configure their websites to automatically receive content newly uploaded to the UACS database. If the augmenting content from the first website is relevant to the content on the second website, it may be automatically distributed to the second website.

24 Claims, 11 Drawing Sheets

FIG. 5C

Enter Mobile Type: [ ]

Next

FIG. 5D disclosure

Enter Code to make sure you are a live person

Send your media to
4081234567@yahoo.com

```
Title: [        ]
Description: [        ]
Tags [        ]

Advanced
Choose Publishing Settings
[ ] Public
    [ ] Only on this site
    [ ] On all partner sites (For better exposure)
[ ] Private
Augment Category
[ ] Enhancement
[ ] Spoof
[ ] Refute
Monetization Option
[ ] Opt-in
    [ ] Donate proceeds to my favorite NPO
    [ ] Deposit proceeds to my bank account
[ ] Opt-out
Next
```

UACS Portal Configuration

Sharing with other websites
[ ] Share all UAC on my website
[ ] Share UAC for only these:
_____
_____

Receiving from other websites
[ ] Opt-in to all UAC from UACS-enabled websites
[ ] Opt-in for only these
_____
_____

FIG. 7

METHOD AND SYSTEM OF PROVIDING USER AUGMENTED CONTENT

BACKGROUND

1. Field of the Invention

The present invention relates generally to the Internet, and more particularly to a method for adding user-generated media into content systems.

2. Description of Related Art

The explosive growth of the Internet has made it not only a major information resource, but also a platform for sharing information among users. Some websites enable users to add information thereto for content enrichment purposes. For example, the website www.wikipedia.com may allow a first user to upload a definition for a term and a second user to add more content to the first user's definition. However, the information uploaded by the second user to the website www.wikipedia.com is merged into the first user's definition as a part of the definition, instead of as an individual document. As a result, it can be difficult for users to find out who contributed what, to find out whether there is newly uploaded information, or to sort, organize or search users' contributions. More importantly, the method of the wikipedia website may only allow users to augment content on the wikipedia website and is therefore website specific. It does not allow users to augment any online content by user generated content.

In another example, the website www.googleearth.com may allow a first user to placemark a place, and other users to add photos, notes, reviews or other information to the placemark. In a further example, the website www.youtube.com may allow users to upload video clips as searchable individual documents. However, these solutions are website specific as well.

Therefore, it may be desirable to provide a system which allows users to augment any online content by user generated content.

BRIEF DESCRIPTION OF THE DRAWING FIGURES

Embodiments of the present invention are described herein with reference to the accompanying drawings, similar reference numbers being used to indicate functionally similar elements.

FIGS. 5A-5F illustrate user interfaces presented during the process for augmenting content of a website according to one embodiment of the present invention.

FIG. 7 illustrates a user interface for settings for sharing and receiving user augmented content according to one embodiment of the present invention.

DETAILED DESCRIPTION

The present invention provides a system and method which may allow users to augment any online content by user generated content and to share that content across websites. A user may add some information to a first website. The information may be displayed on the first website as a related file and stored in a user augmented content system (UACS) database as an individual document. Another user may add some information to a second website to enrich its content, and the information may be displayed on the second website as a related file and stored in the UACS database as another individual document. The documents may be stored together with some keywords, and may be tagged, indexed and searchable. Users may easily find out who contributed what to the websites, and configure their websites to automatically receive content newly uploaded to the UACS database. The invention may be carried out by computer-executable instructions, such as program modules. Advantages of the present invention will become apparent from the following detailed description.

Figure 1:
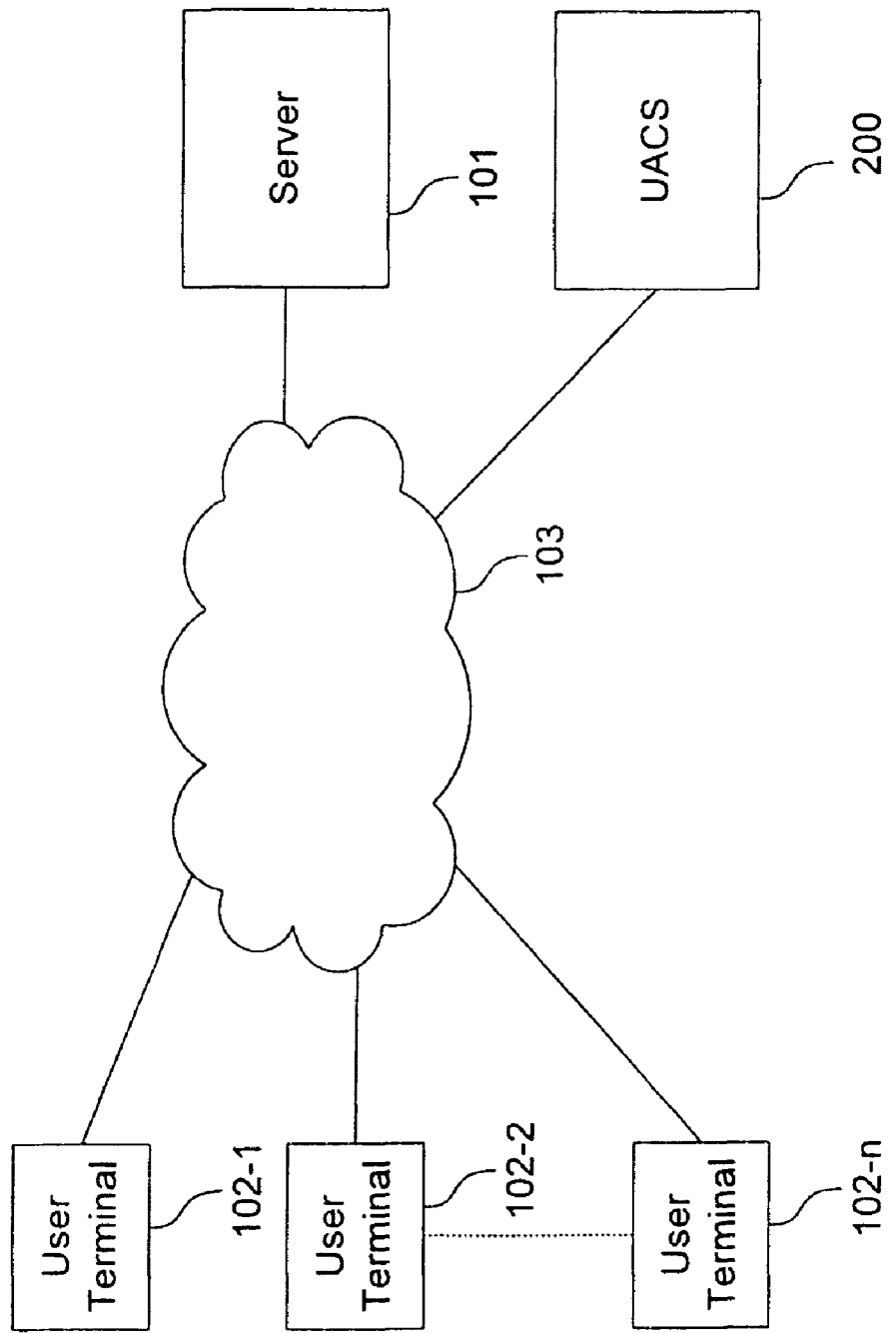
FIG. 1 illustrates an exemplary environment in which a user augmented content system (UACS) of the present invention may be used.

FIG. 1 illustrates an exemplary environment in which a user augmented content system (UACS) of the present invention may be used. As shown, a Web server 101 may communicate over a network 103 with a number of user terminals 102-1, 102-2, . . . 102-n. The Web server 101 may be a computer system and may control the operation of a website or a Blog. In another embodiment, 101 is an FTP server. The user terminals 102 may be personal computers, handheld or laptop devices, microprocessor-based systems, set top boxes, or programmable consumer electronics. Each user terminal may have a browser application configured to receive and display web pages, which may include text, graphics, multimedia, etc. The web pages may be based on, e.g., HyperText Markup Language (HTML) or extensible markup language (XML). Network connectivity may be wired or wireless, using one or more communications protocols, as will be known to those of ordinary skill in the art.

A user augmented content system (UACS) 200 may communicate with the Web server 101 and user terminals 102 via the network 103.

Figure 2:
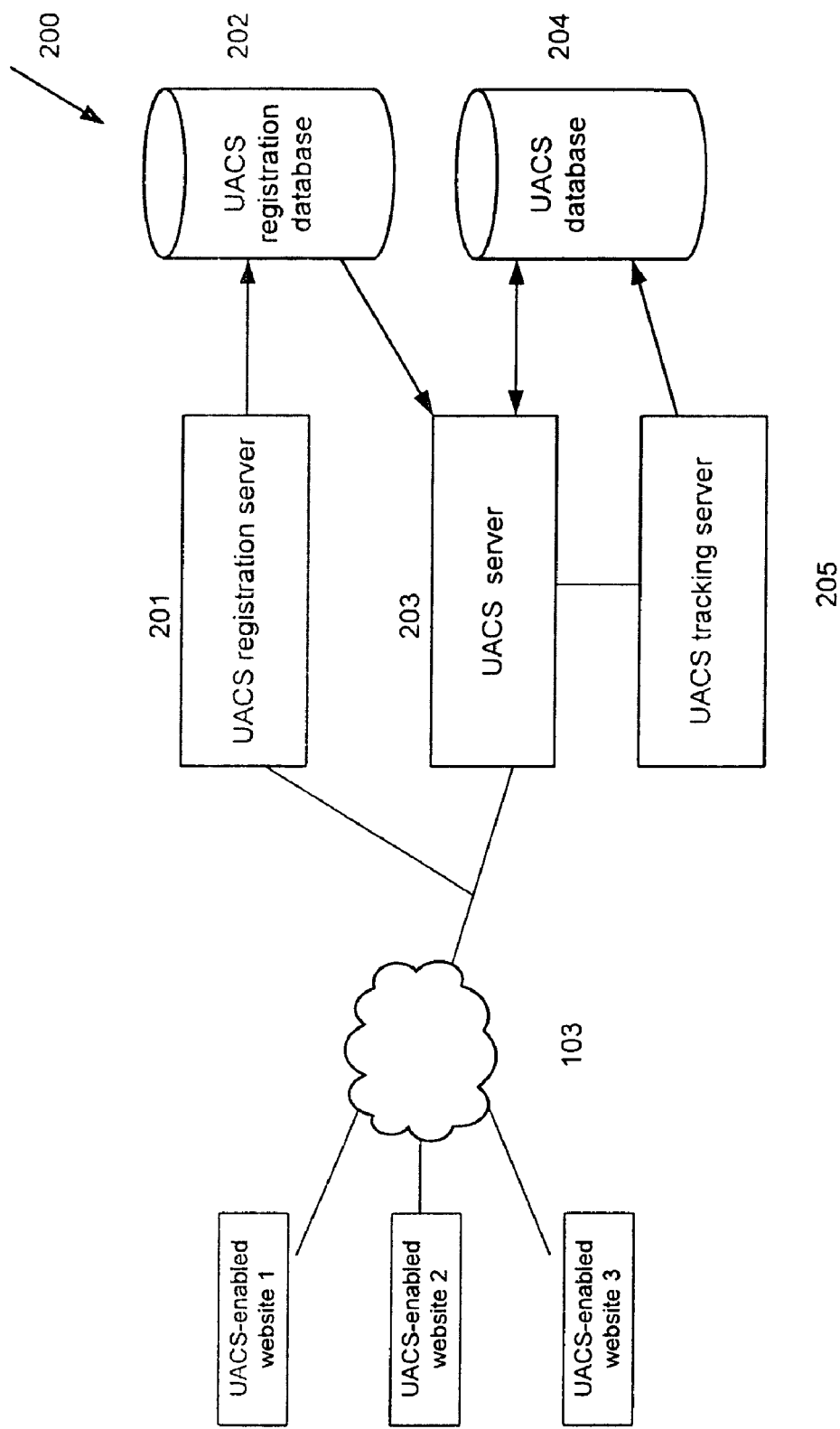
FIG. 2 illustrates a user augmented content system (UACS) according to one embodiment of the present invention.

FIG. 2 illustrates a user augmented content system (UACS) according to one embodiment of the present invention. As shown, the UACS 200 may include a UACS registration server 201, a UACS user registration information database 202, a UACS server 203, a UACS database 204, and a UACS tracking server 205.

When a user, e.g., John, registers for the UACS service, the UACS registration server 201 may receive the user's inputs over the Internet, store user registration information in the UACS registration information database 202, and control the process for initiating the UACS service, as described in more detail with reference to FIG. 3.

The UACS server 203 may be a computer system, which may include one or more of a screen, an input device, a processing unit, a system memory and a system bus coupling various components in the computer system. The UACS server 203 may communicate with user terminals 102 and the Web server 101 over the Internet. The UACS server may receive user augment content from users via UACS-enabled websites 1, 2 and 3 and share the user augment content across the UACS-enabled websites. The UACS server 203 may control processes related to the UACS service, including but not limited to those described below. One such process is a user authenticating process. When the user John inputs his login information, the UACS server 203 may look in the database 202 for a match. When a match is found, the UACS server 203 may authenticate the user. The UACS server 203 may control uploading of user augmented content. When the user John, who has signed up for the UACS service, uploads a document to a UACS enabled-website, the UACS server 203 may control the process described with reference to FIGS. 4A, 4B and 5A-5F. The UACS server 203 may control display of user augmented content, as described below in more detail with reference to FIGS. 6A-6C. The UACS server 203 may also control configuration of UACS settings of a website, as described below with reference to FIG. 7. Users may manipulate information in the UACS database 204 through the UACS server 203.

The UACS database 204 may receive from the UACS server 203 uploaded documents and keywords about these documents, such as name, subject and author, and store them.

The UACS tracking server 205 may track transaction of files uploaded through the UACS server 203, e.g., upload, view and share, and store the transaction history information into the UACS database 204.

It should be understood that the UACS registration server 201 and the UACS tracking server 205 may be functional modules or other parts of the UACS server 203, and the UACS user registration information database 202 and the UACS database 204 may be part of the same database.

Figure 3:
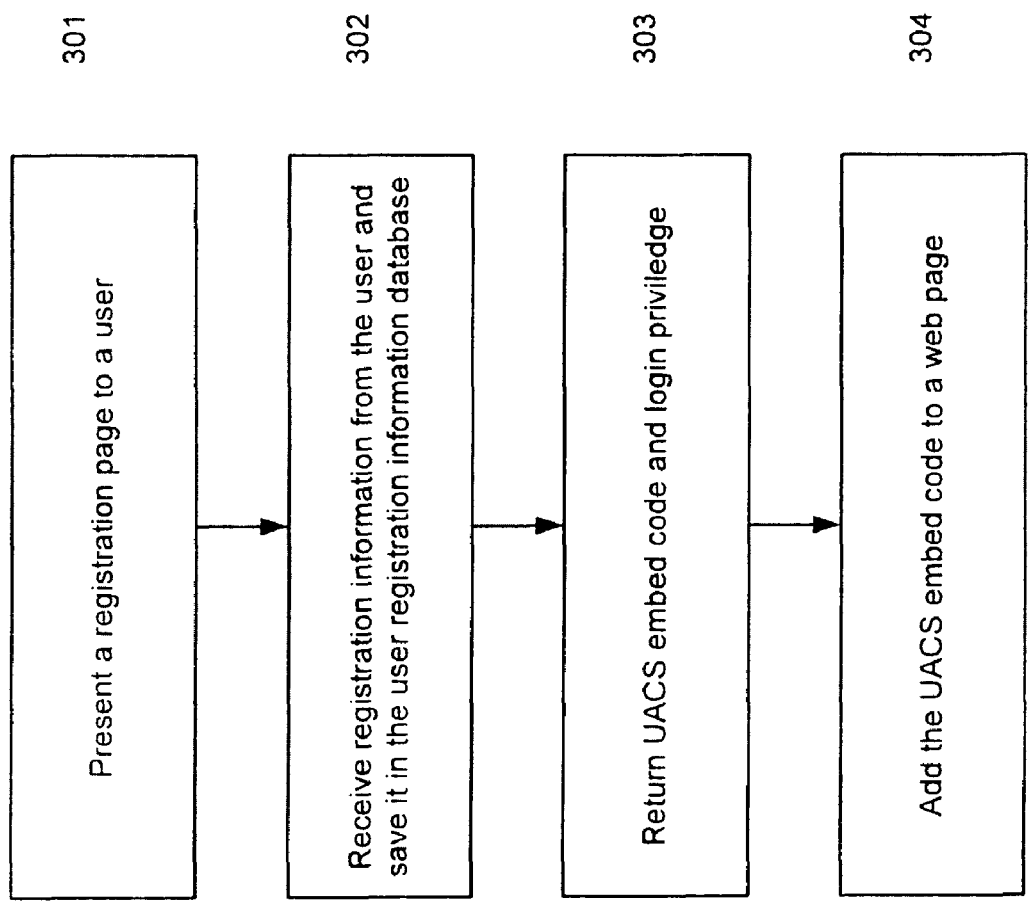
FIG. 3 illustrates a flow chart of a method for initiating the UACS service according to one embodiment of the present invention.

FIG. 3 illustrates a flow chart of a method for initiating the UACS service according to one embodiment of the present invention. The user John may want to register for the UACS service and make his Blog a UACS-enabled website. At 301, the UACS registration server 201 may present a registration page including boxes for various type of registration information. The registration information may include, e.g., the user's login information, gender, geographic location and interested topics. The UACS system may use the login information to collect user activity information.

At 302, the UACS registration server 201 may receive the registration information of the user John using the user terminal 102-1 via the network 103 and store the information in the UACS user registration information database 202.

At 303, the UACS registration server 201 may return UACS embedded code and login/password privileges to the user terminal 102-1.

Figure 5A:
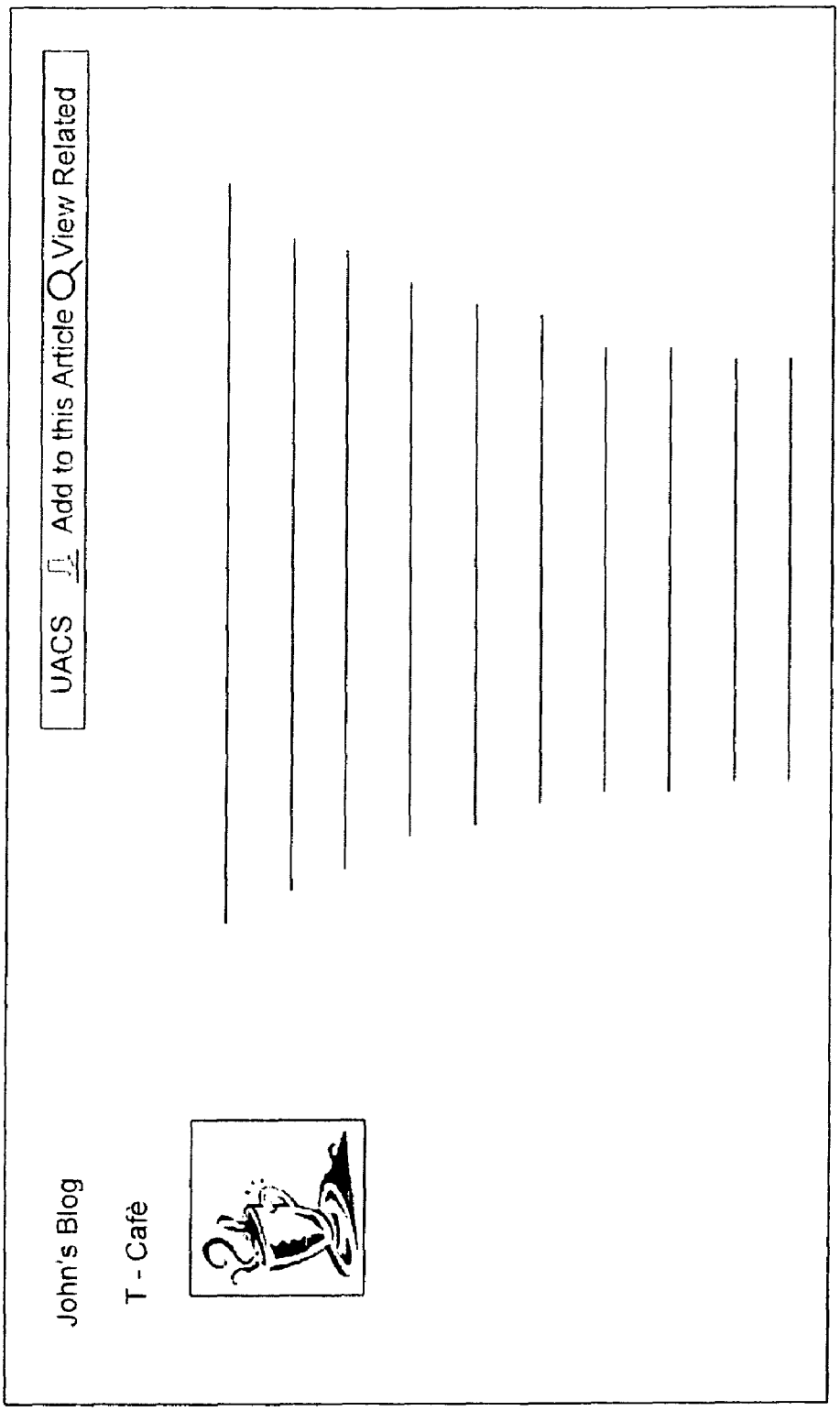

At 304, in response to the user's input, the UACS embed code may be added to the website of the user's Blog, making it the UACS-enabled website 1. Users may augment content on any UACS-enabled website by user generated content. Consequently, the UACS code may automatically add a UACS widget, or a UACS bar, to all of John's Blog postings. The UACS widget may allow users to upload media onto John's Blog, and allow the user augmented content of John's Blog to be shared with other websites. As shown in FIG. 5A, the UACS widget may include an "Add to this Article" button for users to contribute media to the website of John's Blog, and a "View Related" button for users to look at content related to a posting on John's Blog and contributed by other users. The UACS widget may also include a button "Search" for John to search data in the UACS database 204.

FIG. 4 illustrates a flow chart of a method for augmenting content of a website according to one embodiment of the present invention.

The user John may have posted an article about a restaurant "T-Café" on his Blog, UACS-enabled website 1. John is an originator in this instance. Since John is a registered user of the UACS service, his Blog is UACS-enabled, and a UACS widget may be automatically attached to the article.

Another user, e.g., Mary, may be viewing the article about the restaurant "T-Café" on John's Blog. Mary may have been to the restaurant, and may want to upload a picture she took there to enrich the content of John's Blog. Mary is a contributor in this instance. At 401, Mary may click on the "Add to this article" button on the UACS widget on the website of John's Blog.

Figure 5B:
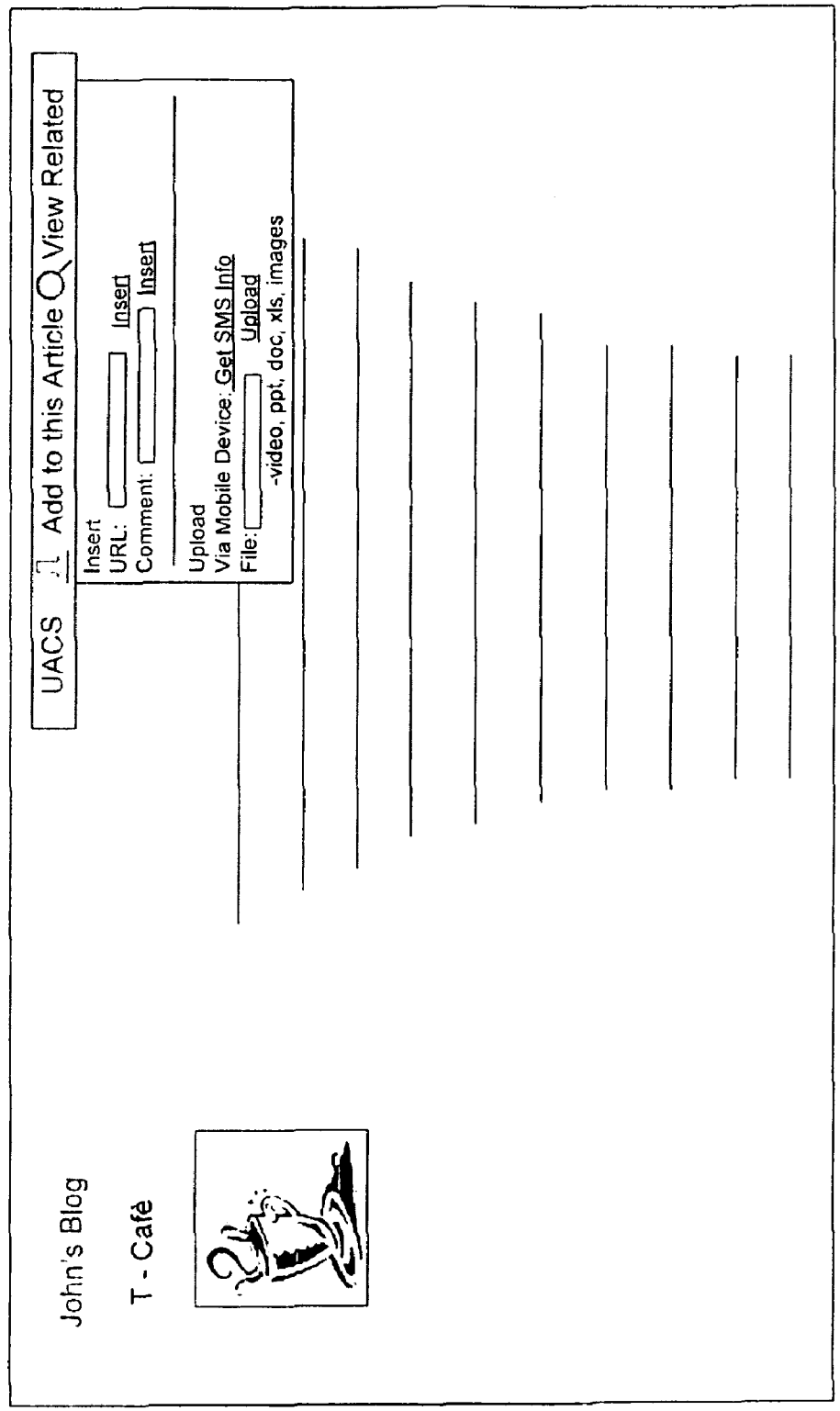

As shown in FIG. 5B, a pull-down menu may be shown to enable users to augment, or annotate, the content of John's Blog. In one embodiment, the pull-down menu may have an insert function for users to input text such as URLs (Uniform Resource Locators) and comments, and an upload function for users to upload files in various types of format, e.g., audio, video, .ppt, .doc, .xls, .tif, .pdf and JPEG. In another embodiment, the user can perform a drag and drop on the UACS-widget of any file. In yet another embodiment, the user can directly add images, videos and audio captured by the device the user is currently using to John's blog.

At 402, Mary may input information about the media she wants to add to John's website. To upload the picture to John's Blog, Mary may input the file name of the picture in a File box, e.g., T-Café picture, and click an "Upload" button. Alternatively, if Mary wants to add an URL to John's Blog, she may type in the URL in an URL box on the pull-down menu and then click a button "Insert" near the URL box. If Mary wants to add comments to John's Blog, she may type her comments in the Comment box and then click an "Insert" button close to the Comment box. To upload content from a mobile device, Mary may click on an button "Get SMS Info" and then send the content via SMS (Short Message Service). To upload images, video clips and audio clips, Mary may drag the document and drop it on the UACS-widget.

In one embodiment, a user interface shown in FIG. 5C may be presented to ask the user to supply the type of the mobile device which may affect the instructions served up to the user during the upload process. Mary may then upload content from her mobile device following the instructions.

At 403, the UACS server 203 may verify the validity of the contributor through a verification process, e.g., CAPTCHA. In one embodiment, a user interface shown in FIG. 5D may be presented to ask the user to enter a code to make sure that the media to be added is from a real person, not spam. When a user wants to upload media from a mobile device, a user interface shown in FIG. 5E may be presented to ask the user to send the media to an email address. It should be understood that user validity verification may be optional and may be performed later in the process. If a user has failed to pass the verification, the process may end at 499. Otherwise, the process may proceed to 404.

In one embodiment, at 403, the UACS server 203 may verify the validity of the files updated to the UASC. The UACS may check against malignant files such as viruses or against copyrighted materials. The copyright validation can occur in conjunction with a trademark application.

At 404, the UACS widget may send the picture to the UACS server 203.

At 405, the UACS server 203 may save the picture as an individual document in the UACS database 204, together with some meta data, like Author (Mary), Media Type (JPEG), Subject (T-Café), date uploaded, device/media used to upload data etc. The UACS server 203 may obtain the meta data by asking the user to input each of them separately during the upload process, or by data mining.

At 406, it may be determined whether John has opted for manual filtration. If not, the process may proceed to 408 directly. Otherwise, at 407, the UACS server 203 may send the picture from Mary to John for verification. If John does not approve the picture, the process may end at 499. If John approves the picture, the process may proceed to 408. Users may choose whether to opt for manual filtration when configuring their UACS setting. It should be understood that 406 and 407 are optional, and the process may proceed from 405 to 408 directly.

At 408, the UACS server 203 may push the picture back to the website of John's Blog for publication.

Figures 5F, 5G:
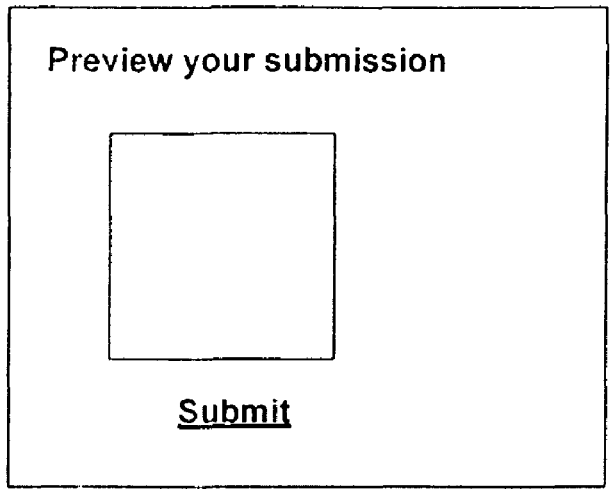

Optionally, in one embodiment, at 409, a user interface shown in FIG. 5F may be presented to Mary, so that she may preview the picture prior to publication. If Mary is happy with the preview, she may click the "Submit" button and the process may proceed to 410. Otherwise, the process may return to 402.

Optionally, in one embodiment, at 410, a user interface for publication preferences shown in FIG. 5G may be presented to ask Mary to select her preferences for publishing the picture. The user Mary may choose Publishing Settings: Public or Private. For private setting, Mary can set view/edit permissions on her file to limit viewing and editing access. For example, she can set view permission so that only she and her friends and family can see the picture. For public publishing, Mary may also choose whether to publish her pictures only on the website of John's Blog, or on all partner sites. Mary may define the category of her augmenting: Enhancement, Spoof, or Refute. Mary may further indicate whether she wants profit from the publication, and if yes, where she wants the profit to go.

Mary's inputs at the user interface for publication preferences may be received at 411.

At 412, the picture may be published on John's Blog. If Mary clicks the "View Related" button on the UACS widget on the website of John's Blog, the link to the picture may appear in the list of related files under the "View Related" button, as an individual document entitled T-Café Picture.

Optionally, John, the originator, may be able to delete Mary's picture from his Blog after the picture is published on his Blog.

At 413, the UACS tracking server 205 may store the transaction history information about the picture together with the picture in the UACS database 204. The transaction history information may be, e.g., Transaction (Upload), Author (Mary), Time (yyyy-mm-dd hh-mm-ss).

Figure 4A:
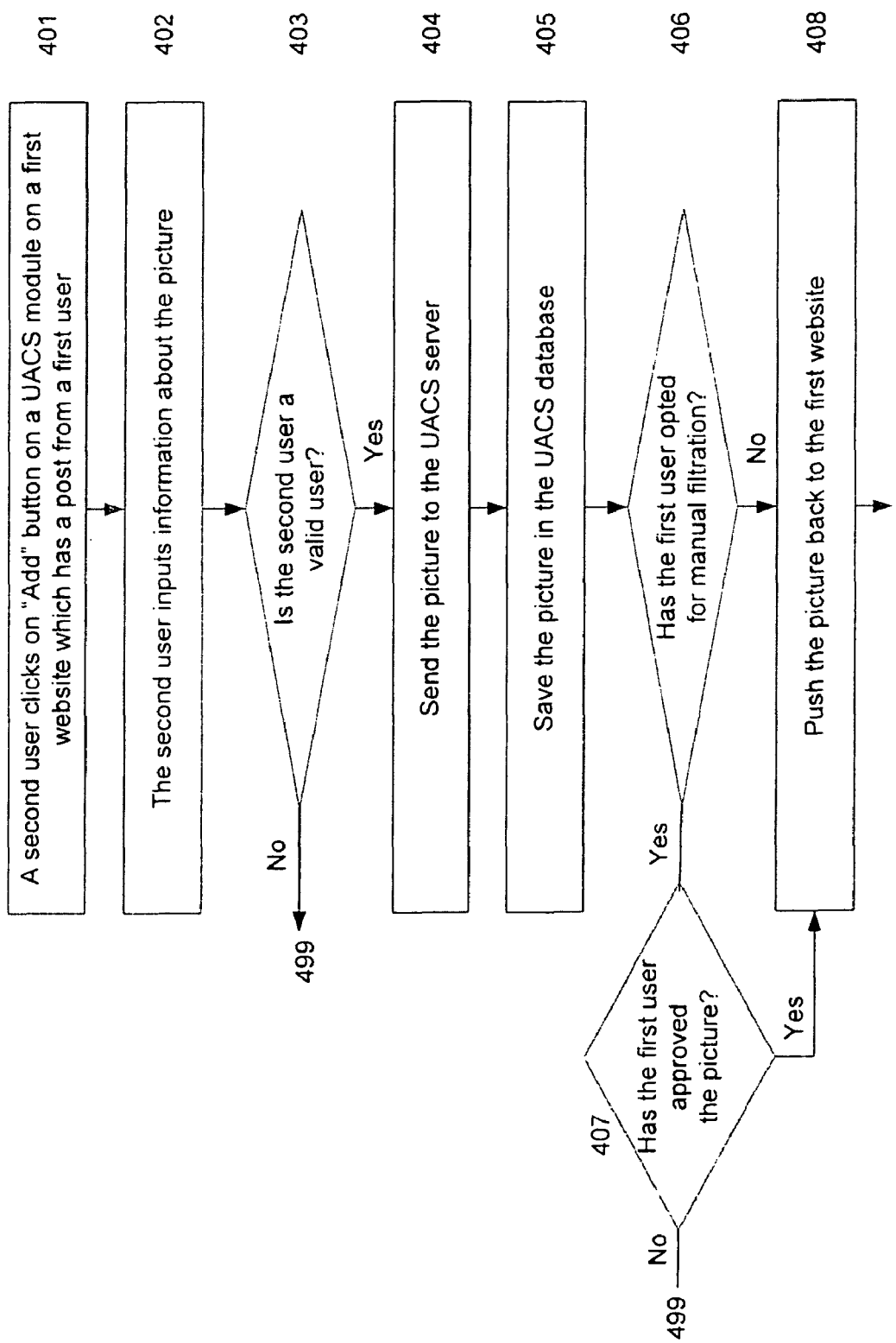
FIG. 4 illustrates a flow chart of a method for augmenting content of a website according to one embodiment of the present invention.
Figure 4B:
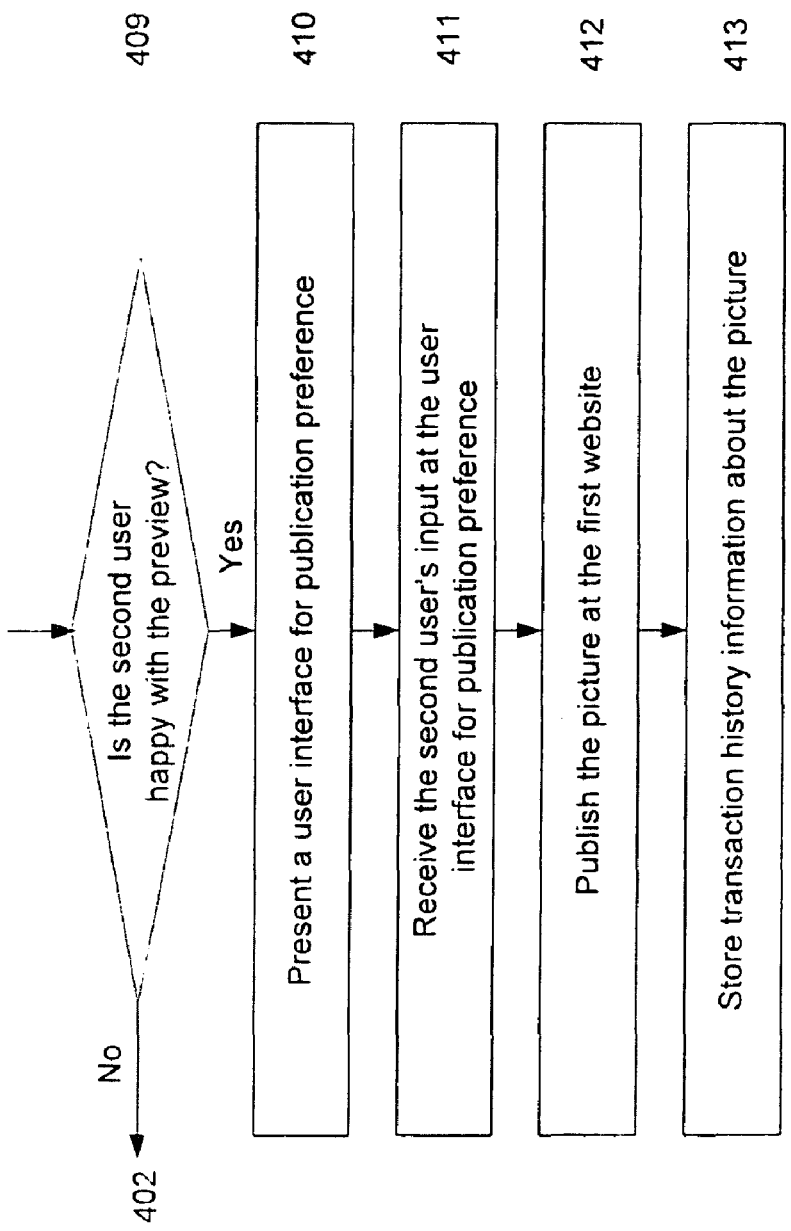

It should be understood that the flow charts shown in FIGS. 4A and 4B are used to explain the general flow of the invention, instead of limiting the number and/or sequence of the steps. For example, 405 may occur after 407.

At the same time, a user David may upload a video clip to enrich the content of the UACS-enabled website 2, e.g., www.yahoo.com, and a user Jim may upload an audio clip to enrich the content of a UACS-enabled website 3. The present invention may allow users to upload content to the UACS database 204 from any UACS-enabled website, and may allow content in the UACS database 204 to be shared on UACS-enabled websites. The present invention also may allow users to augment content on any website with user generated content by adding the UACS widget to the website to make it a UACS enabled website.

Figure 6A:
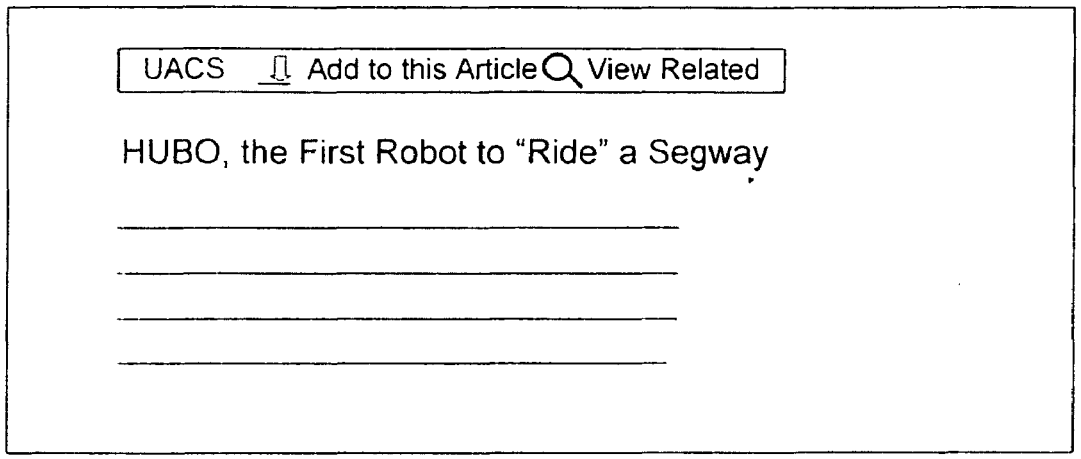
FIGS. 6A, 6B and 6C illustrate user interfaces for viewing user augmented content according to one embodiment of the present invention.
Figure 6B:
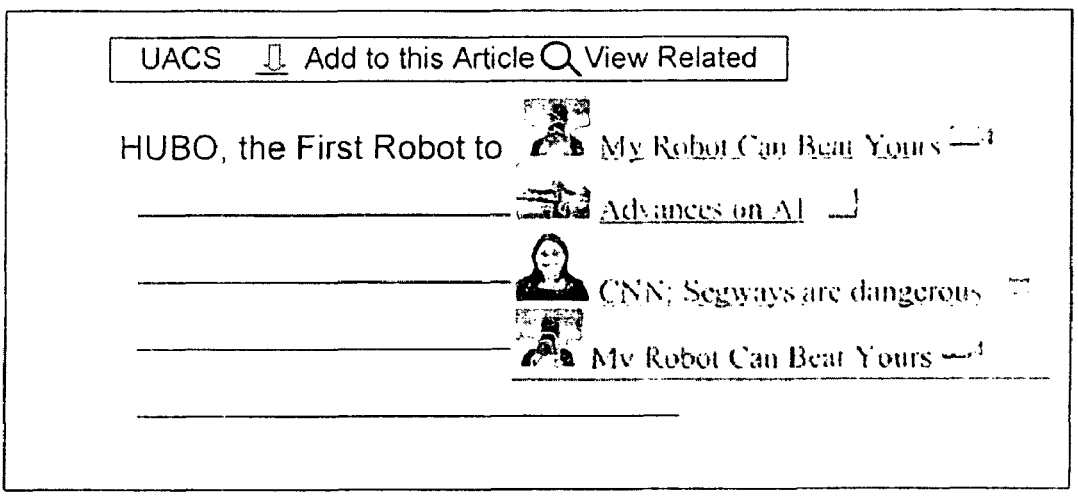
Figure 6C:
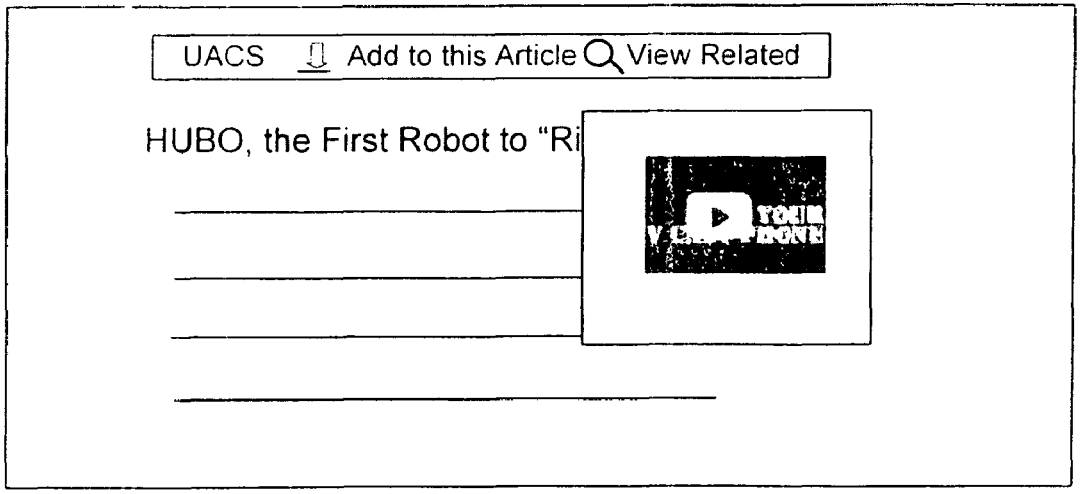

FIGS. 6A, 6B and 6C illustrate user interfaces for viewing user augmented content according to one embodiment of the present invention.

As shown in FIG. 6A, the user Mary may come across an article entitled "Hubo, the First Robot to 'Ride' a Segway" on John's Blog. Since the article is on the UACS-enabled website 1, a UACS widget may be displayed at a prominent location on the website. As described with FIGS. 5A and 5B above, the UACS widget may have a button "Add to the Article" and a button "View Related."

The user Mary may click on the "View Related" button. As shown in FIG. 6B, a pull-down menu may be displayed below the "View Related" button. The pull-down menu may have links to media related to the article "Hubo, the First Robot to 'Ride' a Segway." The media may be sorted by name, date, type or ranking. The media may be added by other users, or be added by the UACS server 203 automatically according to John's settings for receiving UACS content, as described below with reference to FIG. 7.

In one embodiment, the UACS database 204 may store transaction history information of all user augmented content, e.g., upload, view and share. When presenting the list of files under the "View Related" button, the UACS server 203 may decide the sequence by the number of times a file has been viewed or shared. In another embodiment, the user John can set the "View Related" list manually. Other users can also rearrange the list via the UACS interface.

If the user clicks on one of the links, e.g., "My Robot Can Beat Yours," the corresponding video clip may be displayed, as shown in FIG. 6C. The user Mary may comment on the video clip, or rank the media.

FIG. 7 illustrates a user interface for settings for sharing and receiving user augment content according to one embodiment of the present invention. User augment content (UAC) may refer to any content generated by a user to enrich the content of a website. As shown, an originator may set to share all or individual UAC on his website with other websites in the UACS network. In one embodiment, the originator John may set to share all UAC by selecting a general checkbox "Share All UAC On My Website" to permit UAC on his website to be shared and displayed on other UAC enabled websites. In one embodiment, when a contributor Mary uploads a picture onto John's Blog, the picture is marked as "Share" when being saved into the UACS database 204, because of the settings of John's Blog. If another originator David happens to post a video clip about T-Café on his Blog, the UACS-enabled website 3, the UACS server 203 may access data saved in the UACS database 204 to find out whether there is any UAC media about T-Café. The UACS server 203 may find John's article and the picture contributed by Mary. The UACS server 203 may then include John's article and the picture uploaded by Mary in the list of links under the "View Related" button on David's Blog, if the settings of David's Blog permit it.

Alternatively, a user may set share permissions for individual UAC. In one embodiment, John may have a number of postings on his Blog, but he may only want to share UAC added to the T-Café article. John may go to the UACS Portal Configuration page, browse content on his Blog to add the file name of the T-Café article to the list under the option "Share UAC Content for These." Consequently, among the UAC added to various postings on John's Blog, only those added to the T-Café article may be marked as "Share" in the UACS database, and may be shared and displayed on other UACS-enabled websites.

Meanwhile, a user may configure the receiving function of his UACS-enabled website to receive all or individual content from the UACS network. As shown in FIG. 7, the user may set to receive any shared content from the UACS network by selecting a general checkbox "Opt-in to All User Augmented Content." As a result, if there is any "Public" file in the UACS database 204 related to a posting on a UACS-enabled website, the UACS server 203 may include the "Public" file in the list of links under the "View Related" button of the UACS-enabled website. For example, if David posts a video clip about T-Café on his Blog, the UACS-enabled website 3, the UACS server 203 may push all files in the UACS database 204 about T-Café to David's Blog, including John's article and the picture uploaded by Mary. Optionally, if John removes his article from his Blog, John's article may be deleted from the UACS database 204, and from all websites which may have received John's article from the database 204 as shared content. If John revises his article, the UACS database 204 and all websites which may have received John's article from the database 204 may be updated accordingly.

Alternatively, the user may modularly set to receive shared UAC per posting by including the posting under the "Opt-in for Only These" option. For example, David may including the file name of his video clip about "T-Café" under the option "Opt-in for Only These" to receive UAC related to T-Café. If the user is specifically interested in content from a specific website, he may include the link to that website under the option "Opt-in for Only These."

Although the embodiments above use Blogs as examples of UACS-enabled websites, it should be understood that the UACS widget may be installed on any website and make it UACS-enabled. In one embodiment, when a user David searches for the restaurant T-Café on Yahoo! website, he may get a list of search results and click on an article about the restaurant on Yahoo! News. If the Yahoo! website is UACS-enabled, by clicking "View Related" on the UACS bar, the user may look at the article on Yahoo! News, John's article and the picture uploaded by Mary from the UACS-enabled website 1, the video clip from the UACS-enabled website 3, and media about the restaurant from other websites.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method comprising:
    receiving, at a server, a plurality of files annotating contents at a plurality of websites, wherein each file in the plurality of files was uploaded to the server in association with content at one of the plurality of websites;
    wherein the plurality of files comprises:
        a first set of one or more files that were uploaded to the server in association with first content at a first website; and
        a second set of one or more files that were uploaded to the server in association with contents, other than the first content, at websites, other than the first website, in the plurality of websites;
    the server causing display of the first set of one or more files in association with the first content at the first website;
    the server further causing display of the second set of one or more files in association with the first content at the first website;
    wherein a first page from the first website comprises the first content and code that, when executed from within the first page, causes display of an interface for uploading files to the server in association with the first content;
    wherein the first set of the one or more files are received via user interactions with the interface;
    wherein the code, when executed from within the first page, further causes the display of the first set of one or more files and the display of the second set of one or more files in association with the first content;
    wherein the method is performed by one or more computing devices.

2. The method of claim 1, further comprising the server selecting the second set of one or more files to display in association with the first content based on data indicating that each file in the second set of one or more files is related to the first content.

3. A system comprising one or more computer processing units that execute instructions to perform the method of claim 2.

4. The method of claim 1, further comprising:
    the server distributing said code for insertion into pages, at the plurality of websites, comprising said contents;
    wherein the code, when executed from within each page of said pages, causes display of an interface for uploading files to the server in association with content belonging to the page;
    wherein the plurality of files are received via user interactions with interfaces displayed as a result of execution of the code distributed by the server at the plurality of websites.

5. A system comprising one or more computer processing units that execute instructions to perform the method of claim 4.

6. The method of claim 1, further comprising:
    the server distributing the code for insertion into the first page.

7. A system comprising one or more computer processing units that execute instructions to perform the method of claim 6.

8. The method of claim 1, further comprising:
    distributing said code for insertion into pages, at the plurality of websites, comprising said contents;
    wherein the code, when executed from within each page of said pages, causes display of an interface for uploading files to the server in association with content belonging to the page;
    wherein the plurality of files are received via user interactions with interfaces displayed as a result of execution of the code distributed by the server at the plurality of websites.

9. A system comprising one or more computer processing units that execute instructions to perform the method of claim 8.

10. The method of claim 1, wherein the plurality of files comprises a first file of a first type and a second file of a second type.

11. A system comprising one or more computer processing units that execute instructions to perform the method of claim 10.

12. The method of claim 1, wherein the first content was provided by a first user, wherein at least a first file in either the first set of one or more files or the second set of one or more files was uploaded by a user other than the first user.

13. A system comprising one or more computer processing units that execute instructions to perform the method of claim 12.

14. The method of claim 1, wherein the server is operated by a different entity than the plurality of websites.

15. A system comprising one or more computer processing units that execute instructions to perform the method of claim 14.

16. The method of claim 1, wherein causing the display of the first set of files is performed by causing the display of a list of links to the first set of files.

17. A system comprising one or more computer processing units that execute instructions to perform the method of claim 16.

18. The method of claim 1, wherein the one or more files in the plurality of files are media clips.

19. A system comprising one or more computer processing units that execute instructions to perform the method of claim 18.

20. The method of claim 1, wherein the second set of one or more files are further selected from the plurality of files based on permissions set by one or both of: a first user who provided the first content and one or more users who uploaded the second set of one or more files.

21. A system comprising one or more computer processing units that execute instructions to perform the method of claim 20.

22. The method of claim 1, wherein the second set of one or more files are selected based on a search operation performed in a search interface associated with the first content.

23. A system comprising one or more computer processing units that execute instructions to perform the method of claim 22.

24. A system comprising one or more computer processing units that execute instructions to perform the method of claim 1.

* * * * *